(12) United States Patent
Priest et al.

(10) Patent No.: US 6,309,005 B1
(45) Date of Patent: Oct. 30, 2001

(54) HINGE ASSEMBLY FOR TONNEAU COVER

(75) Inventors: William L. Priest, Royal Oak; Mark Duane Nicholas, Waterford; Joseph Michael Johnson, Huntington Woods, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/685,546

(22) Filed: Oct. 10, 2000

Related U.S. Application Data
(60) Provisional application No. 60/158,945, filed on Oct. 12, 1999.

(51) Int. Cl.[7] ....................................................... B60P 7/02
(52) U.S. Cl. ..................................................... 296/100.06
(58) Field of Search ........................... 296/100.06, 100.1, 296/106

(56) References Cited

U.S. PATENT DOCUMENTS

| | | | |
|---|---|---|---|
| 2,516,196 | * 7/1950 | Fowler | 16/235 |
| 2,647,788 | * 8/1953 | Kaiser et al. | 296/106 |
| 2,793,907 | * 5/1957 | Hess et al. | 296/106 |
| 2,926,402 | * 3/1960 | Styron | 296/106 |
| 3,051,523 | * 8/1962 | Boyce-Smith et al. | 296/100.1 |
| 3,368,500 | * 2/1968 | Raab et al. | 296/100.1 |
| 3,567,209 | * 3/1971 | Lathers | 296/106 |
| 3,762,762 | * 10/1973 | Beveridge et al. | 296/100.1 |
| 3,923,334 | * 12/1975 | Key | 296/100 |
| 5,868,453 | * 2/1999 | Steigner | 296/100 |
| 5,971,446 | * 10/1999 | Lunney, II | 296/100.06 |
| 6,186,576 | * 2/2001 | Kepley et al. | 296/100.1 |

* cited by examiner

Primary Examiner—Stephen T. Gordon
Assistant Examiner—Hilary Gutman
(74) Attorney, Agent, or Firm—Patrick M. Griffin

(57) ABSTRACT

A hard tonneau cover is pivotally attached to each side wall of a truck cargo box having a tail gate by a hinge assembly. Each hinge assembly includes a four bar linkage and a drive mechanism. The four bar linkage consists of a tonneau bracket that is secured to the tonneau cover, a mounting bracket, a hinge link that is pivotally attached to the tonneau bracket at one end by a first pivot and to the mounting bracket at an opposite end by a second pivot, and a control link that is pivotally attached to the tonneau bracket at one end by a third pivot and to the mounting bracket at an opposite end by a fourth pivot. The drive mechanism has a pivot arm that is pivotally attached to the mounting bracket by a fifth pivot, and a drive arm that is pivotally attached to the pivot arm by a sixth pivot and pivotally attached to the tonneau bracket by a seventh pivot so that the tonneau cover and bracket are moved between a closed position and an open position by rotation of the pivot arm. A gas spring that is attached to the mounting bracket and to the pivot arm biases the tonneau cover and tonneau bracket to the closed position. The tonneau cover is opened and closed by an electric motor and an electromagnetic clutch that are supported by the mounting bracket. The electromagnetic clutch has an input member that is driven by the electric motor and an output member that drives a pinion gear. The pinion gear in turn drives a sector gear that is attached to the pivot arm.

6 Claims, 2 Drawing Sheets

HINGE ASSEMBLY FOR TONNEAU COVER

This patent application claims priority of Provisional Application No. 60/158,945 filed Oct. 12, 1999.

FIELD OF THE INVENTION

This invention relates to a pick-up truck having, a cargo box that is covered by a hard tonneau cover and more particularly to a hinge assembly for pivotally attaching the hard tonneau cover to the cargo box.

BACKGROUND OF THE INVENTION

Pick-Lip trucks are normally manufactured with an open cargo box at the aft end that is usually equipped with a tall gate that can be lowered to provide access to the load floor of the cargo box. Hard tonneau covers that are attached to the pick-up box manually are already known. Hard tonneau covers generally provide excellent protection f or the contents of the cargo box and compliment the aesthetic value of the pick-tip truck. However, the entire hard tonneau cover must be detached and moved aside manually in order to provide access to the forward portion of the cargo box.

SUMMARY OF THE INVENTION

This invention provides a hinge assembly for attaching a hard tonneau cover to the cargo box of a pick-Lip truck so that the hard tonneau cover can be pivoted to an open position easily. The hinge assembly of the invention is adapted to be attached to the side wall of the cargo box and incorporates a four bar linkage so that the tonneau cover can be opened and closed without interfering with the truck cab or operation of the tail gate. The hinge assembly is preferably power operated.

BRIEF DESCRIPTION OF THE DRAWING

The presently preferred embodiment of the invention is disclosed in the following description and in the accompanying, drawings, wherein.

DETAILED DESCRIPTION OF A PREFERRED EMBODIMENT

Figure 1:
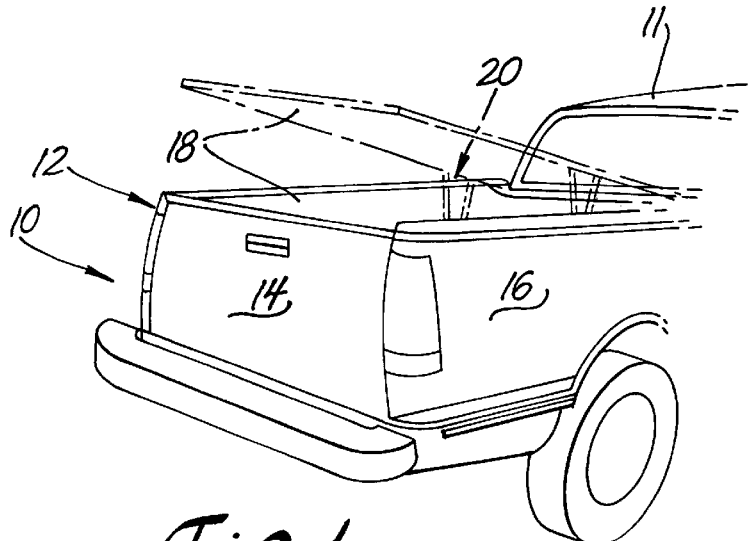
FIG. 1 is a perspective view of the rear portion a pick-up truck having a hard tonneau cover attached to its cargo box with a hinge assembly of the invention.

Referring now to the drawing, FIG. 1 illustrates a pick-up truck having a forward cab 11 and a cargo box 12 at the aft end. The aft end of cargo box 12 has a tail gate 14 that swings about a horizontal hinge (not shown) located at the aft end of the load floor of cargo box 12. Tailgate 14 swings between a closed position shown in FIG. 1 and a open position that is about 90° clockwise from the closed position shown in FIG. 1. Cargo box 12 is also equipped with a hard tonneau cover 18 that is pivotally attached to each side wall 16 of the cargo box 12 by a hinge assembly 20 of the invention. Each hinge assembly 20 is near cab 11 so that the hard tonneau cover 18 swings from the closed position shown in solid line FIG. 1 to an open position located about 55°–60° clockwise from the closed position. The open position is shown in dashed line in FIG. 1.

Figure 2:
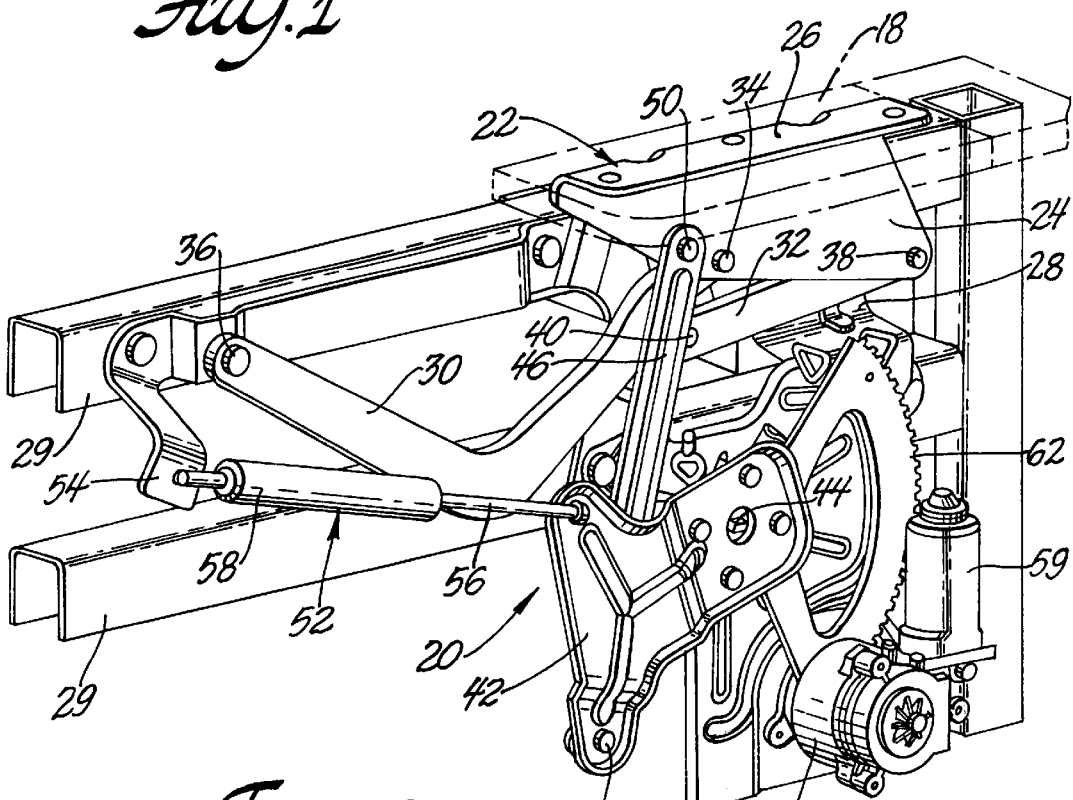
FIG. 2 is a fragmentary perspective view of the pick-up truck of FIG. 1 showing the hinge assembly when the hard tonneau cover is closed.
Figure 3:
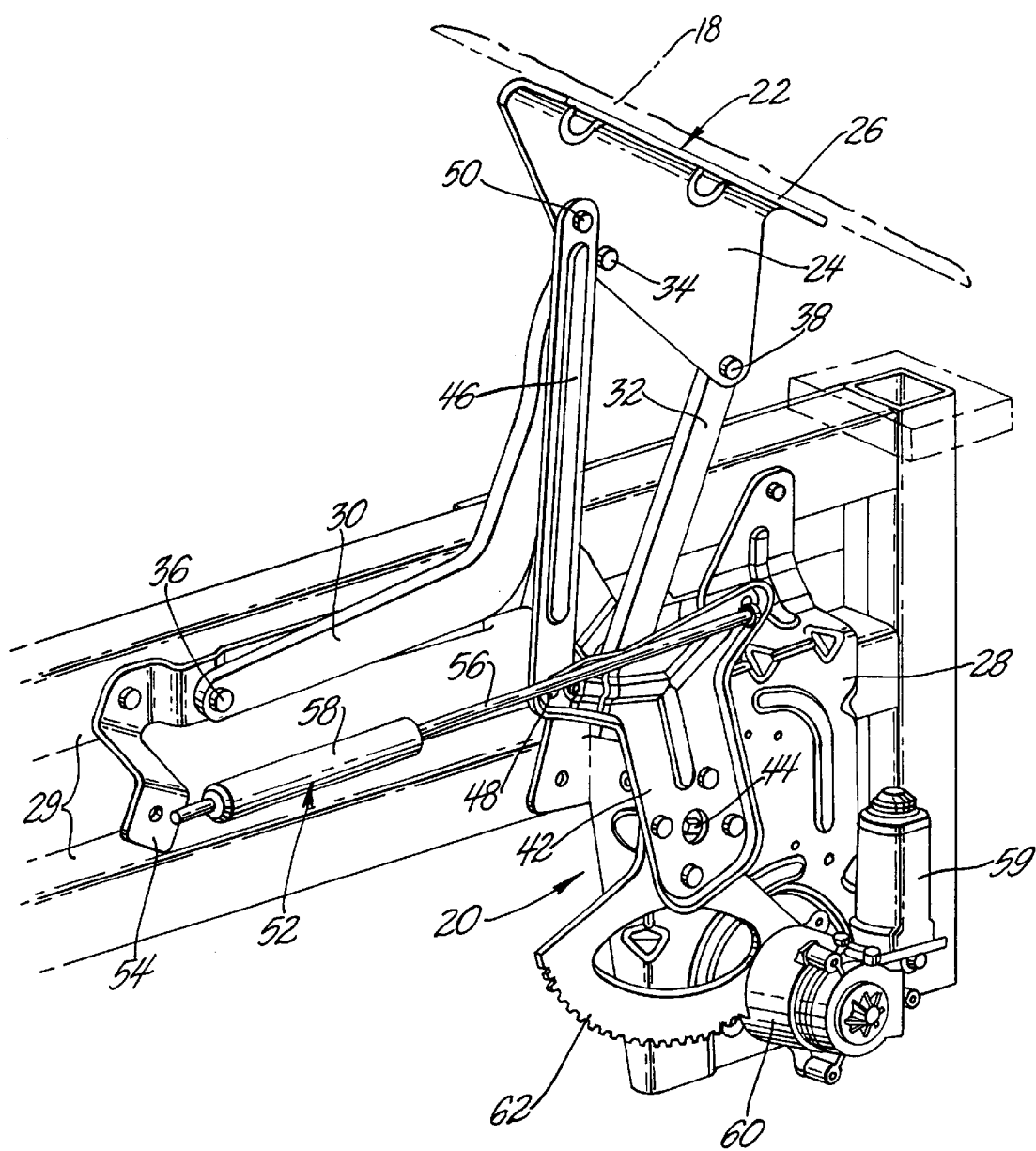
FIG. 3 is a fragmentary perspective view of the pick-up truck of FIG. 1 showing the hinge assembly when the hard tonneau cover is raised.

Referring now to FIGS. 2 and 3, hinge assembly 20 comprises a tonneau bracket 22 in the form of an angle plate that has a vertical pivot plate 24 with a flat transverse plate 26 at an upper end. Transverse plate 26 is secured to the tonneau cover 18 which is shown in phantom for clarity of the hinge parts. Hinge assembly 20 further includes a mounting bracket 28 that is riveted or otherwise suitably secured to reinforcement channels 29 forming part of the side wall of the cargo box 12 near the cab 11. Tonneau bracket 22 is attached to the mounting bracket 28 for swinging movement between the closed position shown in FIG. 2 and the open position shown in FIG. 3 by hinge link 30 and control link 32.

Hinge link 30 is pivotally attached to tonneau bracket 22 at one end by a first pivot pin 34 and to mounting bracket 28 a second pivot pin 36. Control link 32 is pivotally attached to tonneau bracket 22 at one end by a third pivot pin 38 that is spaced from pivot pin 34 and to mounting bracket 28 at an opposite end by a fourth pivot pin 40 that is spaced from pivot pin 36. Thus, the tonneau bracket 22 and links 30 and 32 that attach the tonneau bracket 22 to the mounting bracket 28 for swinging movement constitute a four bar linkage system or hinge.

Hinge link 30 is forward of and longer than control link 32 and preferably in the shape of a shallow Vee or boomerang to maximize access to cargo box 12 when tonneau cover 18 is open as best shown in FIG. 3.

Hinge assembly 20 also includes a drive mechanism for swinging tonneau bracket 22 and the tonneau cover 18 that is attached to it between the closed and open positions shown in FIGS. 2 and 3 respectively. The drive mechanism includes a Y or T shaped pivot arm 42 that is pivotally attached to mounting bracket 28 by a fifth pivot pin 44 and a drive arm 46. Drive arm 46 is pivotally attached to an upper rearward branch of pivot arm 42 by a sixth pivot pin 48 at one end and pivotally attached to tonneau bracket 22 by a seventh pivot pin 50 at an opposite end. This mechanism swings tonneau bracket 22 and the tonneau cover 18 attached to it from closed position of FIG. 2 to the open position of FIG. 3 by rotation of pivot arm 42 in the clockwise direction and back to the closed position by rotation of pivot arm 42 in the counterclockwise direction.

Hinge assembly 20 preferably includes a gas spring 52 that is attached to an offset tab 54 of mounting bracket 28 and to an upper forward branch of Y-shaped pivot arm 42 for biasing tonneau bracket 22 and tonneau cover 18 to the closed position as shown in FIG. 2. When tonneau bracket 22 and cover 18 are swung to the open position of FIG. 3 rod 56 is pulled out of cylinder 58 of gas spring 52 storing energy in the gas spring 52 which biases the tonneau bracket 22 and cover 18 toward the closed position. Compare FIG. 2 showing tonneau cover 18 in the closed position to FIG. 3 showing tonneau cover 18 in the open position.

Hinge assembly 20 is preferably power driven and thus further includes a reversible electric motor 59 by that is supported on mounting bracket 28 by an electromagnetic clutch 60 that is secured to the lower end of mounting bracket 28. Electromagnetic clutch 60 has an input member that is driven by electric motor 59 and an output member that drives a pinion gear (not shown) that meshes with a sector gear 62. Sector gear 62 is attached to pivot arm 42 and pivots with pivot arm 42 about pivot pin 44. Control circuits for reversible electric motors and electromagnetic clutches are well know to those skilled in the art and thus need not be described in detail.

Tonneau cover 18 is swung from the closed position of FIG. 2 to the open position of FIG. 3 by energizing electric motor 59 and electromagnetic clutch 60 to rotate pivot and 42 clockwise about 90° from the position of FIG. 2 to the position of FIG. 3 causing tonneau bracket 22 to move aft away from truck cab 11 and tilt clockwise simultaneously so that the at end of tonneau cover 18 is raised away from tailgate 14 as it moves aft. A hinge assembly on the opposite side wall of cargo box 12 operates in the same way at the same time so that the tonneau cover 18 swings open in a balanced manner. The four bar linkage or hinge consisting of brackets 22 and 28 and links 30 and 32 of hinge assembly 20 on each side of cargo box 12 controls movement of hard tonneau cover 18 so that the front end of tonneau cover 18 does not interfere with trick cab 11 and the rear end of tonneau cover 18 does not interfere with tail gate 14 as described above.

When tonneau cover 18 is fully opened, a limit switch or the like is actuated to deenergize electric motor 59 and electromagnetic clutch 60. Tonneau cover 18 is closed by reversing electric motor 59 and engaging clutch 60 so that sector gear 62 is driven back to the position shown in FIG. 2. When tonneau cover 18 is fully closed another limit switch of the like is actuated to deenergize electric motor 59 and electromagnetic clutch 60.

Electric motor and electromagnetic clutch driving both.

Electromagnetic clutch 60 disengages when deenergized so that the tonneau cover can be moved manually in the event of a power failure.

The power operating system describer above preferably includes two indentical drive mechanisms for balanced operation and reduced manufacturing costs. However, the drive mechanisms need not be identical and in some instances, a single drive mechanism may be sufficient.

It is also possible to use two drive mechanisms with a single reversible electric motor and electromagnetic clutch driving both.

While mounting bracket 29 is shown and described as a separate piece, a portion of the side wall of cargo box 12 itself can serve as the mounting bracket with the hinge link 30 and control link 32 pivotally connected directly to the side wall to form the four bar linkage or hinge. Similarly, the tonneau bracket 22 can be an integrated pair of the tonneau cover 18 rather than a separate piece as shown and described above. In other words, many modifications and variations of the present invention in light of the above teachings may be made. It is, therefore, to be understood that, within the scope of the appended claims, the invention may be practiced otherwise than as specifically described.

What is claimed is:

1. In a pick-up truck having a forward cab and a rearward cargo box that is covered by a hard tonneau cover, a hinge assembly for pivotally attaching the hard tonneau cover to a side wall of the cargo box comprising:
   a tonneau bracket that is secured to the hard tonneau cover,
   a mounting bracket that is secured to the sidewall of the cargo box,
   a hinge link that is pivotally attached to the tonneau bracket at one end by a first pivot and to the mounting bracket at an opposite end by a second pivot,
   a control link that is pivotally attached to the tonneau bracket at one end by a third pivot and to the mounting bracket at an opposite end by a fourth pivot,
   a pivot arm that is pivotally attached to the mounting bracket by a fifth pivot, and
   a drive arm that is pivotally attached to the pivot arm by a sixth pivot and that is pivotally attached to the tonneau by a seventh pivot whereby the tonneau bracket and the hard tonneau cover are moved between a closed position and an open position by rotation of the pivot arm.

2. In a pick-up truck as defined in claim 1, the hinge assembly further including a gas spring that is attached to the mounting bracket and to the pivot arm for biasing the tonneau bracket and the hard tonneau cover toward the closed position.

3. In a pick-up truck as defined in claim 1, the hinge assembly further including:
   an electric motor and an electromagnetic clutch that are supported by the mounting bracket,
   the electromagnetic clutch being by the electric motor, and
   a sector gear that is attached to the pivot arm so as to pivot with the pivot arm about the fifth pivot, the sector gear being driven by the electromagnetic clutch.

4. In a pick-up truck as defined in claim 1, wherein the hinge link has a shallow Vee shape to maximize access to the cargo box when the hard tonneau cover is moved to the open position.

5. In a pick-up truck having a forward cab and a rearward cargo box that is covered by a hard tonneau cover, a hinge assembly for pivotally attaching the hard tonneau cover to a side wall of the cargo box comprising:
   a tonneau bracket that is secured to the tonneau cover,
   a mounting bracket that is secured to the side wall of the cargo box,
   a hinge link that is pivotally attached to the tonneau bracket at one end by a first pivot and to the mounting bracket at an opposite end by a second pivot,
   a control link that is pivotally attached to the tonneau bracket at one end by a third pivot that is spaced aft of the first pivot and that is pivotally attached to the mounting bracket at an opposite end by a fourth pivot that is spaced aft of the second pivot,
   the hinge link being longer that the control link and having a boomerang shape,
   a Y or T shaped pivot aim that is pivotally attached to the mounting bracket by a fifth pivot that is below the second pivot and the fourth pivot, the Y or T shaped pivot arm having an upper forward branch and an upper rearward branch,
   a drive arm that is pivotally attached to the upper forward branch of the pivot arm by a sixth pivot and that is pivotally attached to the tonneau bracket by a seventh pivot whereby the tonneau bracket and cover are moved between a closed position and an open position by rotation of the pivot arm and
   a gas spring that is attached to the mounting bracket and to the upper rearward branch of he pivot arm for biasing the tonneau bracket and cover toward the closed position.

6. In a pick-up truck as defined in claim 5, the hinge assembly further including;
   an electric motor and a electromagnetic clutch that are support by the mounting bracket, the electromagnetic clutch being driven by the electric motor, and
   a sector gear that is attached to a lower portion of the pivot arm below the forward branch and the rearward branch so as to pivot with the pivot arm about the fifth pivot, the sector gear being driven by the electromagnetic clutch.

* * * * *